R. L. FORD.
FERTILIZER ATTACHMENT FOR SEED PLANTERS.
APPLICATION FILED SEPT. 13, 1913.
1,211,836.
Patented Jan. 9, 1917.
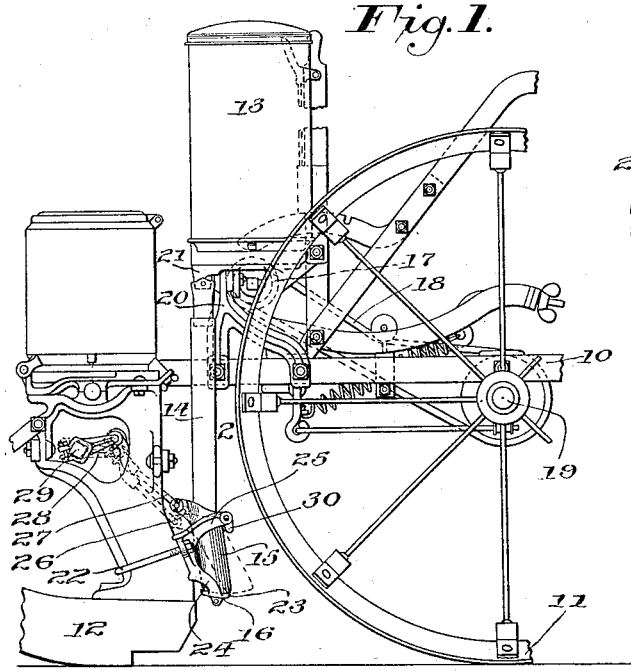
*Fig. 1.*
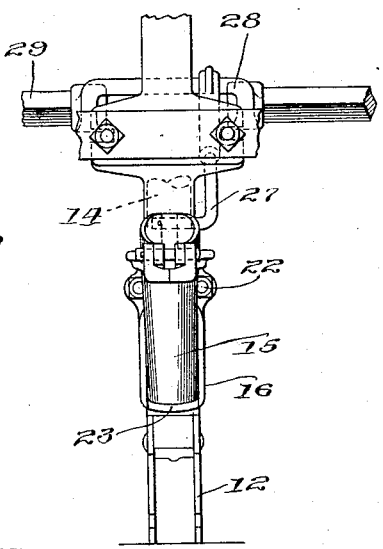
*Fig. 2.*
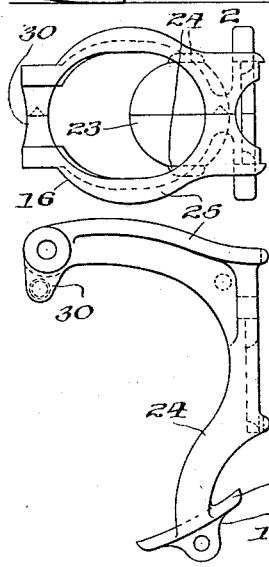
*Fig. 4.*
*Fig. 3.*
*Fig. 6.*
*Fig. 5.*
Witnesses:
C. C. Palmer
Inventor:
Ralph L. Ford,
By
Atty.

UNITED STATES PATENT OFFICE.

RALPH L. FORD, OF CHICAGO, ILLINOIS, ASSIGNOR TO INTERNATIONAL HARVESTER CORPORATION, A CORPORATION OF NEW JERSEY.

FERTILIZER ATTACHMENT FOR SEED-PLANTERS.

1,211,836.  Specification of Letters Patent.  Patented Jan. 9, 1917.

Application filed September 13, 1913. Serial No. 789,701.

*To all whom it may concern:*

Be it known that I, RALPH L. FORD, a citizen of the United States, residing at Chicago, in the county of Cook and State of Illinois, have invented certain new and useful Improvements in Fertilizer Attachments for Seed-Planters, of which the following is a full, clear, and exact specification.

My invention relates to fertilizer attachments for seed planters.

In the operation of devices of this class it is found in practice that fertilizer, because of its viscous nature, adheres to the parts of the container and discharge spout, and particularly to the outlet valve, with such tenacity that the parts of the device soon becomes clogged by the mass of fertilizer formed thereon.

It is the object of my invention to overcome these objections in connection with fertilizer attachments for planters, and this I accomplish by the employment of an improved outlet valve and discharge spout connected together and operating in an improved manner to positively clean their walls of all adhering particles of fertilizer automatically upon each operation of said parts.

One form which my invention may assume is exemplified in the following description and illustrated in the accompanying drawings, in which—

Figure 1 shows a side elevation of a portion of a corn planter embodying my invention; Fig. 2 shows a detail view taken on line 2—2 of Fig. 1; Fig. 3 shows a side elevation of the valve employed in my device; Fig. 4 shows a plan view of the same; Fig. 5 shows a vertical central sectional view of my improved discharge spout; Fig. 6 shows a plan view of the same.

For the purpose of illustration I have shown a planter frame 10 mounted upon carrying wheels 11 and provided with furrow openers 12, all of ordinary construction.

Generally speaking, the particular form of my improved fertilizer attachment shown herein comprises two fertilizer containers 13 and a conduit 14 for each of the containers leading to the rear lower end of the adjacent furrow opener, a movable discharge spout 15 communicating with the lower end of the conduit and a valve or closure 16 for each of the discharge spouts.

As both fertilizer containers and coacting parts are identical in construction and operation, a description of one will suffice.

The container shown herein is of a well-known construction and is provided within with a feed mechanism (not shown), which mechanism is operated by a sprocket wheel 17 connected by a chain 18 to the axle 19 of the carrying wheels. The container is preferably detachably secured to the frame 10 by means of a bracket 20. An outlet pipe 21 is provided for the container and swingingly attached thereto is the conduit 14 made up of a plurality of sections telescopically received one within the other so that a flexible construction is provided which, when all of the parts are in position, permits considerable movement of the furrow openers relative to the frame 10.

The outlet valve 16 is rigidly secured to the furrow opener by means of a U-bolt 22, and said valve comprises a valve seat or bottom portion 23, upwardly extending side portions 24 and rearwardly extending top portions 25. Journaled within the top portion of the valve is the discharge spout 15, which spout is of a size and shape to receive within it the lower end of the conduit 14 and at its lower end to contact with the bottom portion 23 of the valve in a manner sufficiently engaging to effectually close its end. On the forward upper end of the spout is an outstanding lug 26, and a connecting rod 27 is pivoted thereto at one end and at its other to a rigidly mounted arm 28 carried on the check-row shaft 29 of the planter.

It is, of course, understood that the shaft 29 controls the operation of the seed valves of the planter so that thereby a movement of the discharge spout will be effected whenever the seed valves are opened to drop seed. This movement of the discharge spout will be to the rear substantially in the position shown in dotted lines in Fig. 1, where the end of the spout will be disengaged from the valve 16 so that the fertilizer within will be free to drop to the ground. A limiting lug 30 is formed on the upper rear end of the valve 16 in position to strike the discharge spout when said spout is moved to its open position. The rod 27 and arm 28 are arranged at obtuse angles to each other, so that the speed of the discharge spout is gradually diminished as it reaches its outer limit of movement, and thereby the spout, as it engages the limiting lug, remains stationary for a time sufficiently enduring to insure the complete discharge of its contents. The movement imparted to the spout, however, is of a sufficiently forceful nature so that when it strikes the limiting lug, a vibratory movement is imparted to its walls which serves to positively eject the charge of fertilizer contained within. Moreover, the swinging movement of the spout will operate to scatter the fertilizer over a comparatively large space of ground, and thereby the necessity for special scattering means is eliminated. In practice it is found that it is detrimental to the seed to have the fertilizer come in direct contact therewith and, obviously, by having the discharge spout swing to the rear, as shown in my device, the fertilizer will be scattered immediately behind but not in contact with the seed.

From the method of pivoting the discharge spout and the valve it will be seen that when the spout is swung rearwardly to discharge fertilizer, a long sweeping engagement of the lower end of the spout with the surface of the valve portion 23 will take place, which acts as a brush to positively clean the valve of all adhering particles of fertilizer, and thereby the possibility of the parts becoming clogged is almost, if not entirely, eliminated. By placing the conduit 14 in a substantially vertical position, the opportunities for the fertilizer to stick to the walls are greatly minimized, for the reason that the fertilizer is never stationary in any part thereof. It is in the lower part adjacent to the valve where the fertilizer is retained before being discharged that it becomes fastened to the walls surrounding it. In my device the parts that retain the fertilizer are the discharge spout 15 and valve 16, and therefore the importance of having these parts self-cleaning can be appreciated.

While I have shown and described but one form of my device, it is to be understood, nevertheless, that it is capable of modification and that changes may be resorted to without departing from the spirit of my invention as disclosed in the appended claims.

What I claim as my invention, and desire to secure by Letters Patent, is:

1. In a fertilizer attachment for planters, a container, a discharge spout for said container, a valve for said spout fixed to the furrow opener of the planter and provided with upwardly extending arms to pivotally receive said discharge spout, and means for operating said spout to engage and disengage said valve.

2. In a seed planter, a wheeled frame, furrow openers carried by said frame, a fertilizer container carried on said frame, a conduit for said container, a discharge spout communicating with said conduit, a closure for said spout secured to one of said furrow openers and provided with bearing portions to pivotally receive said spout, a limiting lug on said closure, and means operated by said planter to swing said spout away from the closure and strike said limiting lug with a force sufficient to impart a vibratory movement to the walls of said spout.

In testimony whereof I affix my signature in the presence of two witnesses.

RALPH L. FORD.

Witnesses:
 EVAN EVANS,
 HERBERT DEKKER.

Copies of this patent may be obtained for five cents each, by addressing the "Commissioner of Patents, Washington, D. C."